United States Patent
Barnes et al.

(10) Patent No.: US 7,769,805 B1
(45) Date of Patent: Aug. 3, 2010

(54) MOBILE DEVICE CATALOG AND CACHING AND ARCHITECTURE

(75) Inventors: James D. Barnes, Overland Park, KS (US); Sanjay Kumar Sharma, Olathe, KS (US); Robin D. Katzer, Olathe, KS (US)

(73) Assignee: Spring Communications Company L.P., Overland Park, KS (US)

( * ) Notice: Subject to any disclaimer, the term of this patent is extended or adjusted under 35 U.S.C. 154(b) by 702 days.

(21) Appl. No.: 11/395,190

(22) Filed: Mar. 31, 2006

(51) Int. Cl.
G06F 15/16 (2006.01)
G06F 3/00 (2006.01)

(52) U.S. Cl. .................. 709/203; 709/219; 715/745; 715/746

(58) Field of Classification Search ............. 709/203, 709/219; 715/744–747
See application file for complete search history.

(56) References Cited

U.S. PATENT DOCUMENTS

| | | | |
|---|---|---|---|
| 5,727,129 A * | 3/1998 | Barrett et al. | 706/10 |
| 5,802,292 A * | 9/1998 | Mogul | 709/203 |
| 5,878,223 A * | 3/1999 | Becker et al. | 709/223 |
| 6,055,569 A * | 4/2000 | O'Brien et al. | 709/223 |
| 6,067,565 A * | 5/2000 | Horvitz | 709/218 |
| 6,115,718 A * | 9/2000 | Huberman et al. | 707/102 |
| 6,385,641 B1 * | 5/2002 | Jiang et al. | 709/203 |
| 6,584,498 B2 * | 6/2003 | Nguyen | 709/219 |
| 6,721,780 B1 * | 4/2004 | Kasriel et al. | 709/203 |
| 6,941,310 B2 * | 9/2005 | Ahad et al. | 707/100 |
| 6,959,319 B1 * | 10/2005 | Huang et al. | 709/203 |
| 7,028,261 B2 * | 4/2006 | Smyth et al. | 715/744 |
| 7,047,485 B1 * | 5/2006 | Klein et al. | 715/205 |
| 7,058,691 B1 * | 6/2006 | Yu et al. | 709/207 |
| 7,203,909 B1 * | 4/2007 | Horvitz et al. | 715/765 |
| 7,296,051 B1 * | 11/2007 | Kasriel | 709/203 |
| 2002/0057297 A1 * | 5/2002 | Grimes et al. | 345/810 |
| 2003/0151621 A1 * | 8/2003 | McEvilly et al. | 345/744 |
| 2005/0118996 A1 * | 6/2005 | Lee et al. | 455/425 |
| 2005/0277432 A1 * | 12/2005 | Viana et al. | 455/466 |
| 2006/0069617 A1 * | 3/2006 | Milener et al. | 705/14 |
| 2006/0085766 A1 * | 4/2006 | Dominowska et al. | 715/854 |
| 2007/0130125 A1 * | 6/2007 | Holte | 707/3 |
| 2008/0261634 A1 * | 10/2008 | Viana et al. | 455/466 |

OTHER PUBLICATIONS

"System Overview," VoiceSurf, http://www-users.cs.umn.edu/~vkher/voicesurf/overview.html, Jan. 20, 2006, pp. 1-3.

* cited by examiner

Primary Examiner—George C Neurauter, Jr.

(57) ABSTRACT

A system for personalizing a user experience on a mobile computing device is provided. The system includes a user environment component associated with the mobile computing device. The user environment component is operable for generating a navigational data associated with interactions with the mobile computing device by the user. The system includes a server in communication with the mobile computing device and has an associated user environment manager component. The user environment manager component is operable for processing the navigational data and cache information associated with the user interactions. The server is operable for using the navigational data and other user information to select content to be provided to the user environment component.

14 Claims, 6 Drawing Sheets

MOBILE DEVICE CATALOG AND CACHING AND ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to mobile computing devices, and more particularly, but not by way of limitation, to a system and method of mobile device catalog and caching and architecture.

BACKGROUND OF THE INVENTION

Mobile electronic devices such as mobile telephone handsets or personal digital assistants (PDAs) have enabled greater productivity and have improved quality of life. PDAs enable users the ability to track appointment schedules, store notes, edit text documents, and the ability to interact with other computer-based applications. Mobile telephone handsets have generally been employed solely for telecommunication, however since the advent of the Internet mobile telephone handsets have been endowed with other abilities and services. For example, mobile telephone handsets may include services for text messaging and browsing Internet-based content. However, user experience may be limited by insufficient computing resources of the mobile device and by limited bandwidth of the networks.

SUMMARY OF THE INVENTION

A system for personalizing a user experience on a mobile computing device is provided. The system includes a user environment component associated with the mobile computing device. The user environment component is operable for generating a navigational data associated with interactions with the mobile computing device by the user. The system includes a server in communication with the mobile computing device and has an associated user environment manager component. The user environment manager component is operable for processing the navigational data and cache information associated with the user interactions. The server is operable for using the navigational data and other user information to select content to be provided to the user environment component.

In an embodiment, a method is disclosed that provides a catalog and cached content on a mobile computing device. The method includes generating a navigational data based upon a user information and a first user actions. The method includes updating a graphical user interface (GUI) and cached content for the mobile computing device and on a server based upon the first user's actions. The method includes transmitting the updated GUI and catalog of the cached content to the mobile computing device from the server.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1A:
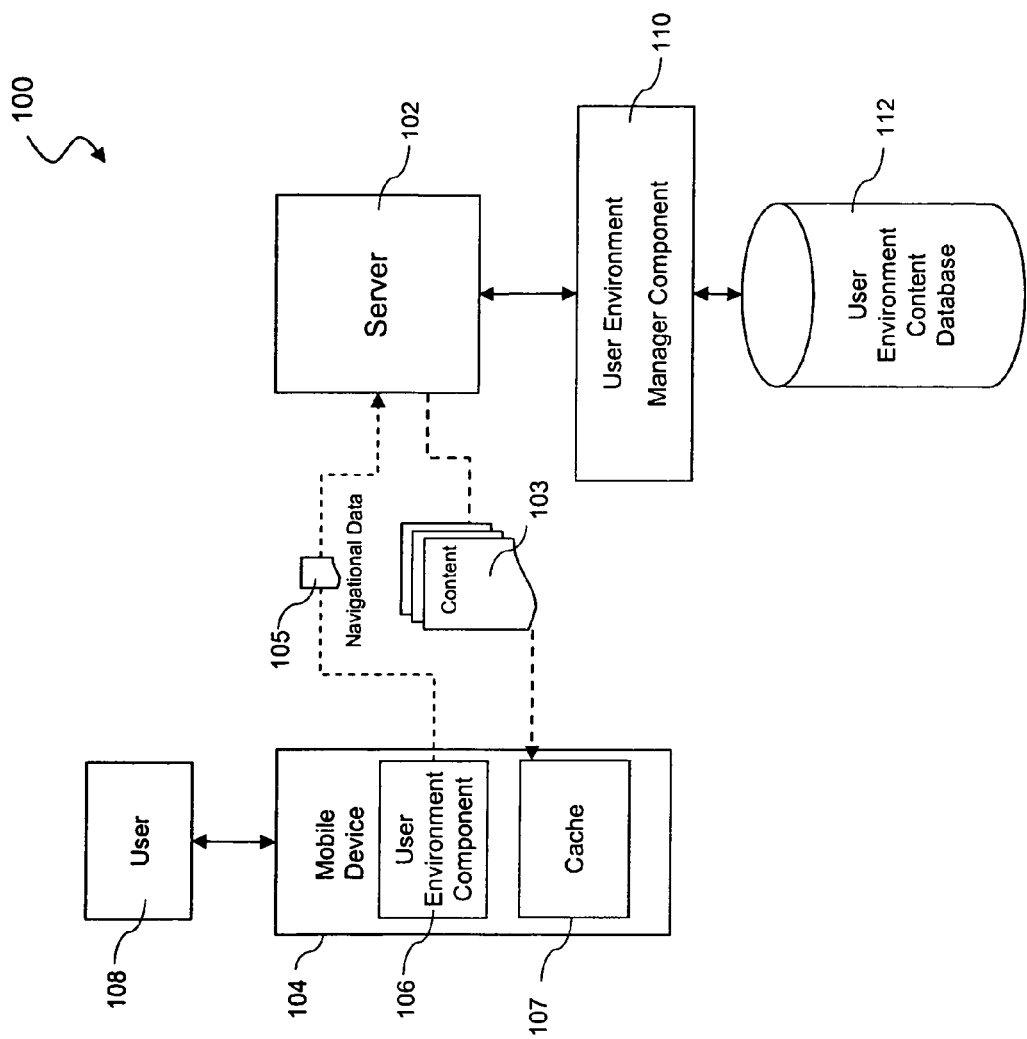
FIG. 1a is a block diagram of a mobile device and architecture according to embodiments of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Bandwidth-limited networks are plagued by high latency transmission of data between one or more clients and servers. Graphical images, audio, and/or other media may include long download times between the server and the client in bandwidth-limited networks. Telecommunication networks often employ communication technologies such as analog cellular, digital personal communication service (PCS), third generation (3G), and/or other mobile communication technologies. Such communication technologies are bandwidth limited and include high latency. For example, digital PCS services are limited to download rates of about 9 kilobits per second, and are often further limited due to normal network activity and interference. Mobile device navigation over the Internet is generally web browser based, which relies on caching of previously visited pages and requires a significant amount of memory to store browser based content. Mobile devices are resource limited and are unable to locally store an adequate amount of web-based content or other media. Consequently, downloading and interacting with media such as audio, video, and/or graphical images is very slow, and results in an undesirable user experience.

Today's mobile networks include thousands of users with handsets based upon digital PCS, 3G communication technologies, and even lower latency technologies such as evolution data optimized (EVDO), and/or other communication technologies. Although the latency and the bandwidth of the communication network improves with each evolution of communication technologies, ever expanding content continues to strain the limited capabilities of these networks and mobile devices.

Accordingly, the present disclosure contemplates a system and method that provides a high-speed low latency user experience on a mobile computing device. The system includes a user environment component residing on the mobile computing device that is operable for generating a navigational data associated with the actions of the user. The user environment component sends the navigational data to a server to promote the gathering of information on the server, such that the server can make intelligent and predictive decisions to provide the user with information more quickly and efficiently, such as by providing menus and content customized for the user and anticipating which data the user will want and downloading all or portions of that data in advance. The content for the user experience may be stored on a remote server. The server includes the user environment manager component that processes the navigational data to catalog and cache information associated with the user experience. The user environment manager component makes decisions based upon the navigational data and/or the actions of the user to determine the type of content to send to the mobile device.

In some embodiments, the user environment manager component determines menus, associated menu structures, and/or content that is presented to the user of the mobile device. For example, the navigational data and/or a profile data gathered from, for example, a customer database may include a user preference for rock-n-roll music, and therefore the user environment manager component dynamically pushes content associated with rock-n-roll music to the user environment component. The user environment component assembles the content from the user environment manager component into one or more content-filled graphical user interface (GUI) screens with menus. The user environment manager component also performs static, proactive, and synchronized caching of information in order to minimize network latency between a network server and the mobile device.

Turning now to FIG. 1a, a system 100 for providing an improved user experience on a mobile computing device is depicted. The system 100 includes a server 102 in communication with a mobile computing device 104. The mobile computing device 104 and/or the server 102 may include one or more applications, programs, data stores, and/or other computer-based systems. The server 102 may be a general-purpose computer, which is discussed hereinafter in greater detail. The mobile computing device 104 may be a mobile telephone or handset, a personal digital assistant (PDA), portable music or video players, or in other embodiments may be desktop or workstation computers, portable laptops, tables, or other computing or communication platforms. In the preferred embodiment, the mobile computing device 104 is a mobile telephone or handset or personal digital assistants (PDAs), for example.

In an embodiment, the mobile computing device 104 includes a user environment component 106 operable for generating or capturing a navigational data 105 or traversal data and for processing information or content 103 having for example media content from the server 102. The navigational data 105 that may be captured includes key strokes selected by the user, menus selected, traversed menu patterns, or other user interaction with the mobile device 104, for example. The navigational data 105 may be processed by a user environment manager component 110 for purposes of providing a user customized, more efficient, and perhaps faster experience for the user 108, such as when browsing the Internet or downloading or accessing content. The mobile device 104 includes cache 107 for local storage of content and other data. Since there is a limited amount of cache 107 on a typical mobile device 104, it is preferable to load cache 107 only with information that will be desired by the user 108.

The mobile device 104 may include a graphical user interface (GUI) adapted for navigating through content such as mobile handset ringers, music, video, text, and/or other media. In an embodiment, the user experience may be improved by providing content 103 that has been predictively selected based on information known about the user 108. The content 103 may be dynamically updated by the user environment manager component 110, and may be based upon the navigational data 105 that may include GUI navigation logging associated with the user's use of the mobile device 104, as well as other information which will be discussed in greater detail below.

The navigational data 105 may include a log file of activity of the user 108 on the mobile device 104. For example, the log may include a history of GUI buttons or links selected and content browsed by the user 108. In some embodiments, the navigational data 105 may also include cache of associated screen content, menu selections and hierarchical associations. In this manner, the navigational data 105 be evaluated by the user environment manager component 110 to identify behavioral information associated with the user 108 and/or the experience of the user 108 on the mobile device 104, such that the user environment manager component 110 is able to make predictive decisions on the type of content 103 that will be placed in the cache 107 of the mobile device 104. Behavioral information may include the button(s) most frequently clicked, menu scroll patterns, favorites menu items, and/or voice responses, for example. In some embodiments, the navigational data 105 may include a record of keystrokes or menu items selected and may be store in a file and periodically transmitted to the user environment manager 110. In other embodiments, the navigational data 105 may be captured and transmitted, substantially real-time, to the user environment manager 110. In either case, the present system achieves these efficiencies while reducing the processing load and storage burden on the mobile device 104, to some extent by shifting the navigational data 105 and associated processing to the user environment manager 110.

The user environment component 106 resides on the mobile computing device 104 and may include one or more applications, algorithms, and/or scripts, or systems. In an embodiment, the user environment component 106 may include a JAVA based application, JAVA 2 Micro Edition (J2ME) based application, or other types of applications such as a C-Sharp application running on Mobile Windows handset, which may be automatically downloaded from the server 102. In an embodiment, one or more applications may operate to form the navigational data 105 to be sent to the server 102, while other applications may operate to process the content 103 to form one or more menus or screens or media on the mobile computing device 104.

The user environment manager component 110 exists on the server 102 and operates remote of the mobile computing device 104 to generate or organize the content 103 based on the navigational data 105. In addition to navigational data 105, the user environment manager component 110 may also use other information such as profile data, which may be maintained in other systems, such as a customer database (not shown) determine preferable content. The user environment manager component 110 enables high-speed content browsing on the mobile device 104 by generating customized content 103 to the cache 107 of the mobile device 104. For example, the user environment manager component 110 may store one or more configuration files or profile data associated with the user 108 in a user environment content database 112. The database 112 may store or organize the content 103, or previously visited content and/or content associated with the navigational data 105, such as predicted user content. For example, the database 112 may store one or more hierarchical menu data associated with an interest of the user 108, such as rock-n-roll music. Therefore, the database may store menus and content, such as audio files or graphical icons related to rock-n-roll. The user environment manager component 110 may dynamically insert or pre-populate the rock-n-roll content 103 into the cache 107 on the mobile device 104 to form menus and make the content 103 available when the user 108 interacts with the mobile device 104.

The user environment component 106 and/or the user environment manager component 110 may operate transparent of the user's 108 awareness, and may dynamically generate the navigational data 105. For example, the user environment component 106 may generate the navigational data 105 continuously, hourly or daily, and may be continuously transmitted to the server 102 or at a pre-determined time. This information is then used to predict the content 103 that will be desired by the user 108 and cached 107 on the mobile device 104.

Figure 1B:
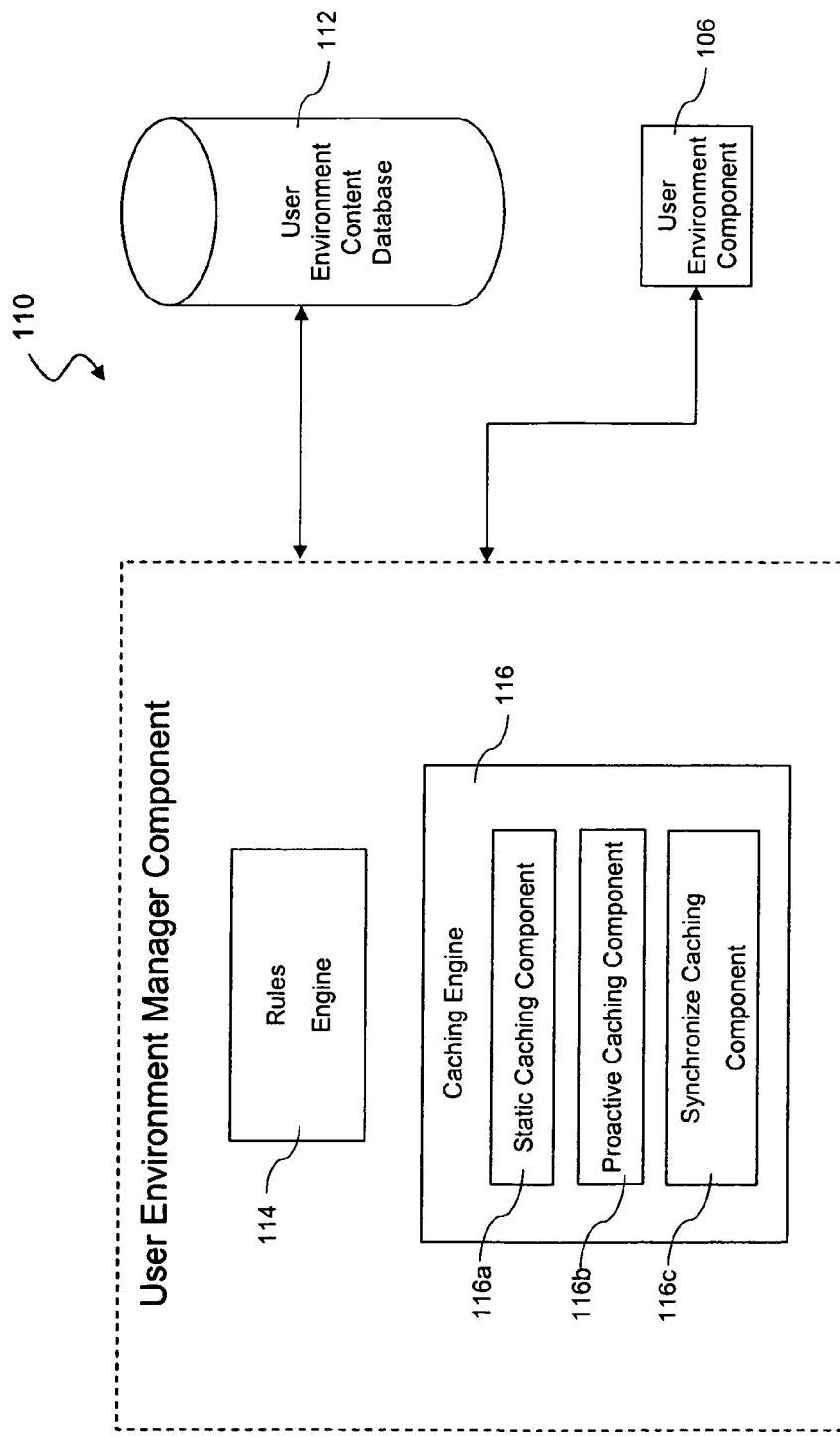
FIG. 1b is a block diagram of a user environment manager component according to one embodiment of the present disclosure.

Turning now to FIG. 1b, a block diagram depicts another embodiment of the user environment manager component 110. The user environment manager component 110 includes a rules engine 114, and a caching engine 116. In an embodiment, the user environment manager component 110 receives the navigational data 105 and generates the content 103. The user environment manager component 110 utilizes the rules engine 114 to select the content 103 to push to the cache 107 based stored information gathered about the user the user 108, such as content stored or collected by the caching engine 116.

In an embodiment, the rules engine 114 forms preferences of the user 108 based upon the interactivity of the user 108 and the mobile computing device 104. For example, the rules engine 114 may process the navigational data 105, such as user GUI screen selections, user inputs, and user navigation through multiple screens and menus to select the content 103. Furthermore, the rules engine 114 may provide menu shortcuts, or reorganize, and/or utilize a profile data gathered from a customer or other database or system to provide content in a manner customized so as to be more intuitive or accessible for the user 108. Alternatively, the rules engine 114 may receive other inputs from the server 102 such as customer data or other information to form the content 103.

In another embodiment, the rules engine 114 may apply one or more rules to determine the content 103 that will be sent to the cache 107 based on the gathered and analyzed information. The cache 107 may include media and other content formed by the server 102 that was filtered by the rules engine 114 based on information analyzed about user preferences. For example, the navigational data 105 that is sent to the server 102 may contain music preferences for rock-n-roll. The server 102 may subsequently send the cache 107 rock-n-roll content 103. The rules engine 114 may periodically analyze the content 103 in the cache 107, and update or refresh the content 103 based on new rules or information known about the user 108.

The caching engine 116 includes one or more components for locally and/or remotely storing content 103 on the server 102 and/or the mobile computing device 104. In an embodiment, the caching engine 116 includes a static caching component 116a, a proactive caching component 116b, and a synchronize caching component 116c. The static caching component 116a stores and caches present content, such as information initially provided during the startup of an application.

The proactive engine component 116b includes one or more components for locally and/or remotely storing and collecting predicted user experience content from, for example, the Internet or the database 112. The proactive engine component 116b uses the navigational data 105 to anticipate the type of content that the user will prefer or menus that will be selected by the user. The proactive engine component 116b may include one or more algorithms, routines, or applications to anticipate the need for additional content based on content currently being accessed by the user 108. The proactive engine component 116b may cache anticipated content on the server 102 and/or the mobile computing device 104 prior to the user 108 selecting the anticipated content. The proactive engine component 116b may also anticipate, catalog, and cache hierarchical menus, screens, and/or other content based upon the navigational data 105 provided by the user environment component 106.

For example, the proactive engine component 116b may observe that the user 108 navigates through menus associated with rock-n-roll music, and subsequently predicts content 103 to be maintained on the server 102 and/or mobile computing device 104 such as particular rock-n-roll artists, images, or associated music and/or video clips, and related menus. In an embodiment, the proactive engine component 116b may also determine content or menus that are locally stored or cached on the mobile computing device 104.

In some embodiments, the proactive engine component 116b may determine content that will be cached 107 on the mobile device 104 based upon a first event or first user experience associated with the static engine component 116a. For example, a first event such as a home menu screen on the mobile computing device 104 may be cached by the static cache component 116a. A GUI on the mobile device 104 may include a home menu screen that includes one or more GUI links or buttons for navigation to content such as mail, news, music, local weather, text or video messaging, videos, maps, and/or other media content. The proactive engine component 116b anticipates associated content for the next or a second event that may be selected by the user 108, such as a screen or menu selections associated with the home menu screen based upon the navigational data 105 and or other information. The proactive engine component 116b then decides on the content 103 that will be cached 107 for the next anticipated event, and so on. In this manner, the proactive engine component 116b may be continually evaluating what screens or menus the user is currently on, and predicts what the user's next selections will be. Based on these predictions, content 103 is sent to the mobile device 104 cache 107. As such, when the user selects predicted content, the user does not have to wait for the content to be downloaded since the content 103 is already available in the cache 107 on the mobile device 104.

The proactive engine component 116b may further include one or more rules to help with decision making for anticipating future selected content or menus on the mobile computing device 104 by the user 108. For example, the rules may include determining content at the root level of a menu presented on the GUI of the mobile computing device 104. The rules may also include determining content for one or more menu nodes (i.e., a menu selection having one or more sub-menus, sub-menu selections and content) and one level down the associated menu nodes. The rules may further include caching as much of a user selected menu and content 103 that is allowed by the resources of the mobile computing device 104.

The synchronize caching component 116c observes the user experience such as content and/or menus of a GUI screen on the mobile computing device 104 to update out of date content on the mobile computing device 104 with associated new content from the server 102. The synchronize caching component 116c may update the home menu screen and/or the second event on the mobile computing device 104 with new content and/or menus from the server 102. For example, the menu screen may include a content menu selection or button for "What Is Hot", which may include one or more menu or content selections for phone ringers, music, news, and/or other content. The synchronize caching component 116c caches content 103 from the server 102 to the mobile device 104 cache 107. Alternatively, the synchronize caching component 116c may update the cache 107 with content 103 associated with both the mobile computing device 104, the user 108, and the user environment content database 112. Therefore, the menu selections and/or content is kept current and any out-of-date or inoperable menu selections or content are removed or replaced.

Figure 1C:
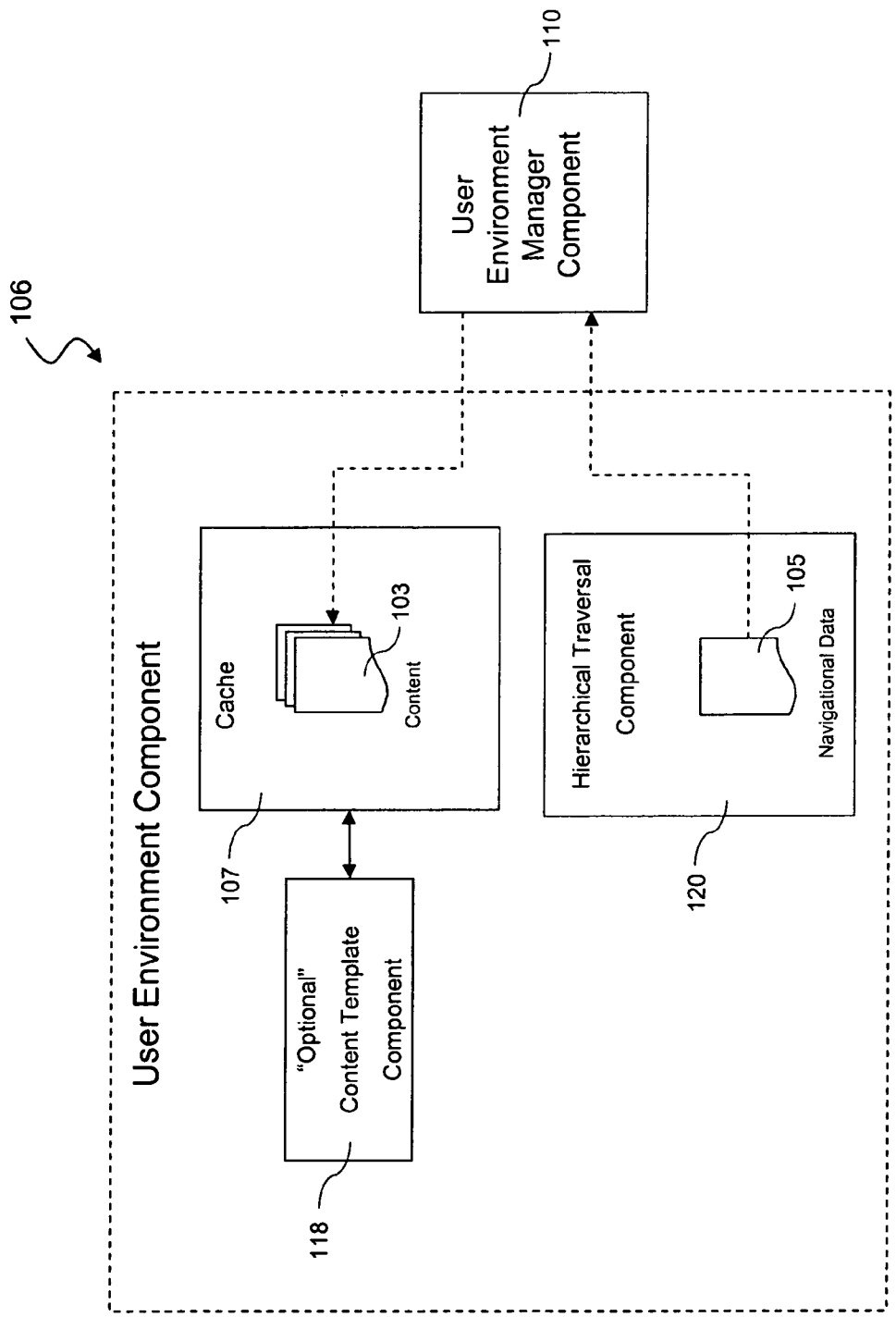
FIG. 1c is a block diagram of a user environment component according to one embodiment of the present disclosure.

Turning now to FIG. 1c, a block diagram depicting another embodiment of the user environment component 106. The user environment component 106 includes an "optional" content template component 118, a hierarchical traversal component 120, and the cache 107. The user environment component 106 receives the cache content 103 from the user environment manager component 110. Of course it is to be understood, that the user environment component 106 may include operational aspects of the user environment manager component 110, and may include one or more applications, routines, or scripts adapted for interfacing with the user environment manager component 110 and the user environment content database 112.

The hierarchical traversal component 120 operates to form the navigational data 105 to be sent to the user environment manager component 110. The hierarchical traversal component 120 may include one or more applications operable for tracking and logging actions of the user 108. The hierarchical traversal component 120 also transmits the navigational data 105 to the user environment manager component 110 to promote the generation of the cache 107. The hierarchical traversal component 120 may track and log button clicks, menu selections, and/or other actions of the user 108. Of course, due to the limited resources of the mobile computing device 104 the hierarchical traversal component 120 includes a small memory storage size and utilizes little computing resources.

In an embodiment, the user environment component 106 receives the content 103 from the user environment manager component 110. Some of this content 103 may be menu content that is used to populate one or more pre-fabricated templates when generating the GUIs on the mobile handset. Alternatively or additionally, content 103 may be inserted into the templates to form one or more content-filled hierarchical menus by the content template component 118 at pre-determined times, such as every morning. Therefore, instant updates of menus and content may be provided by using the content 103. The content template component 118 processes content 103 from the cache 107, which is received from the server 102. The content template component 118 may provide one or more pre-fabricated screens or menus that may be dynamically filled with content from the user environment content database 112.

Figure 2:
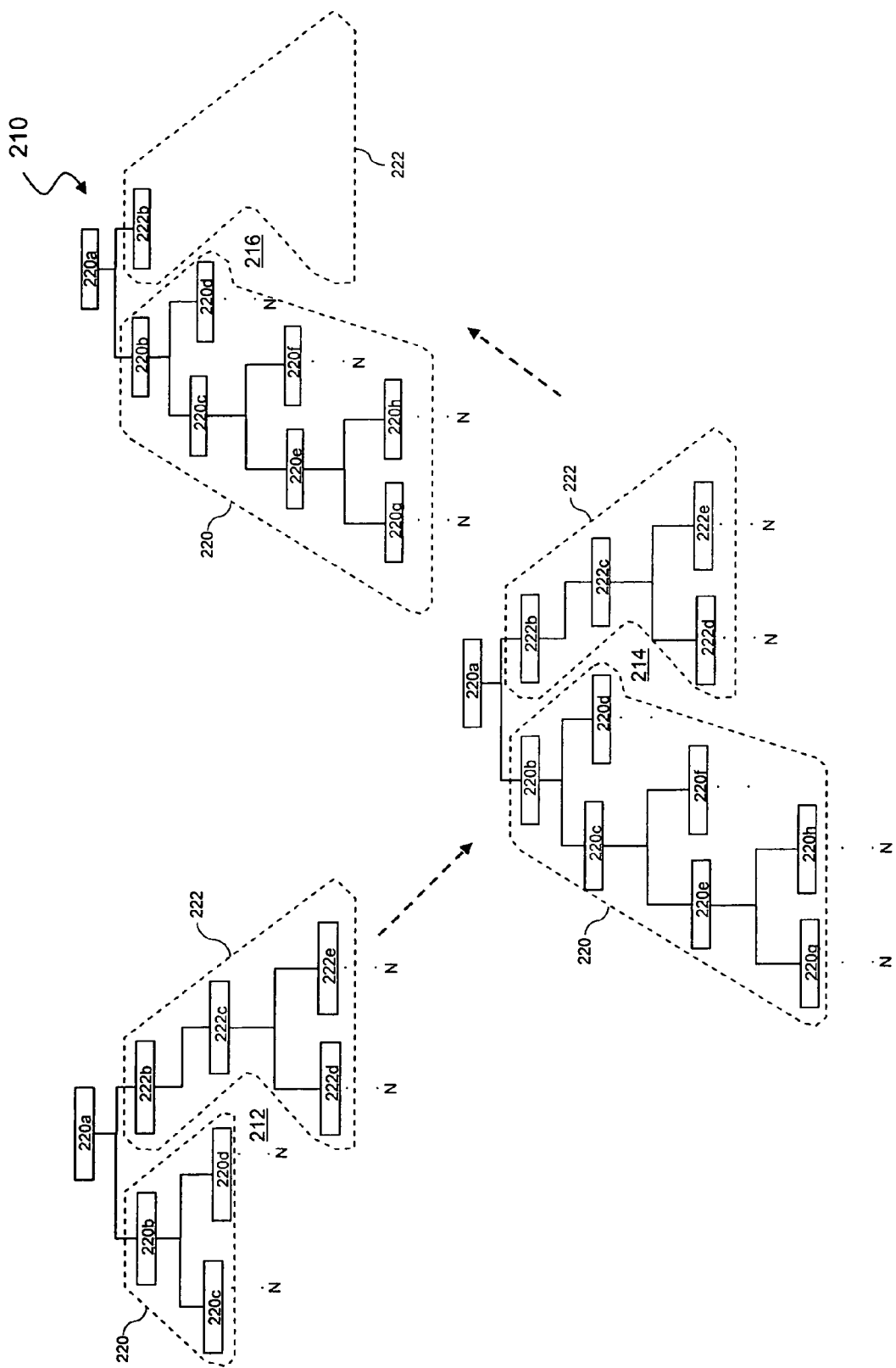
FIG. 2 illustrates one embodiment of mobile device catalog and caching according to another aspect of the present disclosure.

Turning now to FIG. 2, a block diagram depicts an embodiment of the present disclosure. The mobile device 104 includes a graphical user interface (GUI) (not shown) that interfaces with the user environment component 106 to provide the user experience having media content provided by the user environment manager component 110. The GUI includes a set 210 of user customized hierarchical menus "menu trees" or catalogs 212, 214, and 216 provided by the user environment manager component 110.

In an embodiment, the catalogs 212, 214 and 216 may comprise menus of content having news pages, lists of phone ringers, music, and/or or video customized for the user 108. The catalogs 212, 214 and 216 enables high-speed access to media content without making significant accesses to a network. For purposes of illustration, the catalogs 212, 214 and 216 depict user content and hierarchical menu states as information is updated by the user environment manager component 110. The catalogs 212, 214 and 216 change dynamically according to the actions of the user 108. The catalogs 212, 214 and 216 include menu nodes 220 and 222 having menu selections 220a, 220b, 220c, 220d, 220e, 220g, 220h, 222a, 222b, 222c, 222d, 222e, and N.

One or more of the menu selections 220a-h, 222a-e, and N may include associated content having news, lists of phone ringers, music, and/or video customized for the user 108. For example, looking at catalog 212, menu node 220a may be a main menu, and node 220b may provide for selection of media. Selection of 220b may take the user to selections 220c and 220d, for example, associated with phone ringers and music, respectively. As the user 108 navigates from 220a to 220b, the navigation data 105 alerts the user environment manager component 110 to generate the content 103 in anticipation of selection of 220c. The content 103 might include a list of associated phone ringers. The user environment manager component 110 might also apply other rules when selecting the content 103, such as based on knowledge of the user's preferences and history.

The user environment component 106 receives the content 103 into the cache 107 and uses it to form catalog 214 and the menu selections 220e, 220f, 220g, and 220h. The menu selections 220e, 220f, 220g, and 220h may include other phone ringer content such as movie theme ringers, classical music ringers, rock-n-roll ringers, and other sub-categorical phone ringers such as by music artist. Thus as the user navigates to one part of the menu, such as 220c, new menu selections 220e, 220f, 220g, and 220h are provided for the user. This process includes obtaining new content underlying or associated with the menu selections. One or more of the menu selections 220a-h, 222a-e, and N and associated content may also be dynamically erased from the cache 107 of the mobile computing device 104 to make room for the current content 103 as needed.

For example, the menu selection 222b may be associated with news pages, and may include menu selection 222c with subordinate menu selections 222d and 222e and accompanying content 103. At a pre-determined time or if the user 108 happens to not access the menu selection 222c, 222d, and 222e often, or if the space in cache 107 is needed for currently anticipated content 103, these menus 222c, 222d, and 222e and accompanying content may be removed or overwritten, as shown in catalog 216. In this manner, resources on the mobile computing device 104 are conserved and therefore more resources are available for storing anticipated and customized content. Thus, when the user 108 selects one of the menu items 220e, the related content 103 will be accessible without waiting for it to download since it is already in cache 107.

Intelligent decisions are made by the user environment manager component 110 in order to maximize caching and to reduce network activity. This results in a desirable user experience on the mobile computing device 104. In an embodiment, the caching engine 116 may make decisions based upon rules associated with the proactive caching component 116b. For example, the rules may include caching at the root menu selection 220a of the catalogs 212, 214, and 216 presented on the GUI of the mobile computing device 104. The rules may also include caching one or more menu nodes 220 and 222 and at least one level down within the menu selections 220a-h, 222a-e, and N. The rules may further include caching as much of a user selected menu selections 220a-h, 222a-e, and N and associated content that is allowed by the resources of the mobile computing device 104. Therefore, the navigational data 105 and the cache 107 synergistically work together to add and remove menus and content based upon the user experience.

Figure 3:
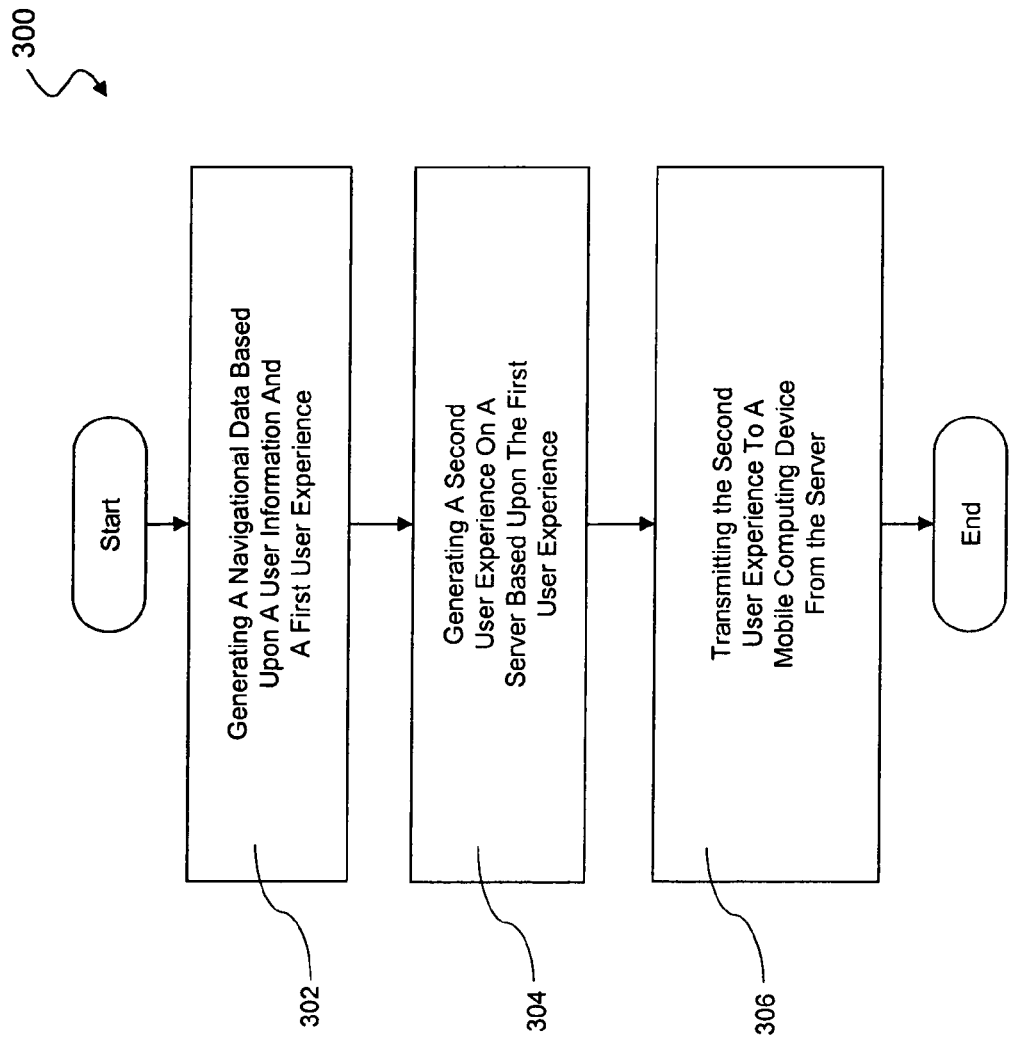
FIG. 3 is a flow diagram of a method for providing a user experience on a mobile computing device according to one embodiment of the present disclosure.

Turning now to FIG. 3, a flow chart illustrates a method 300 for generating the navigational data 105 based upon information from the user experience on the mobile computing device 104. In block 302, the user 108 may select a GUI icon, a GUI menu button, an image, a telephonic ring tone, audio recording or ringer, or other information on the mobile computing device 104 provided by the user environment component 106. In an embodiment, block 302 may also include logging and/or caching actions or input of the user 108 by the navigation data 105. For example, this may include a cache of screens, menus, and/or other information collected by the caching engine 116 that the user 108 navigates through on the mobile computing device 104.

In block 304, an interface on the device, such as the GUI, GUI icons, GUI menu buttons, images, telephonic ring tones, audio recordings or ringers, or other information on the mobile computing device 104 is generated by the user environment manager component 110. The GUI may be based upon the navigational data 105 or information provided by the user 108. The relevant information for the GUI may be stored in the database 112 or elsewhere. It will be appreciated that the customization of the user interface, including the GUI and cached content information, may include changing any information or content accessible to the user and any navigational or other aspects of the user interface.

In block 306, this content 103 is then provided by the user environment manager component 110 to the user 108 on the mobile computing device 104. The content 103 may be any information, data, media, files, and so on. The content 103 may be based upon the navigational data 105 or information provided by the user 108 or gathered elsewhere. Of course, it is to be understood that the blocks 302 through 304 may be executed sequentially or in parallel by the system 100. Furthermore, operational aspects of the server 102, the mobile computing device 104, the user environment component 106, and/or the user environment manager component 110 may co-exist within the same data store.

Figure 4:
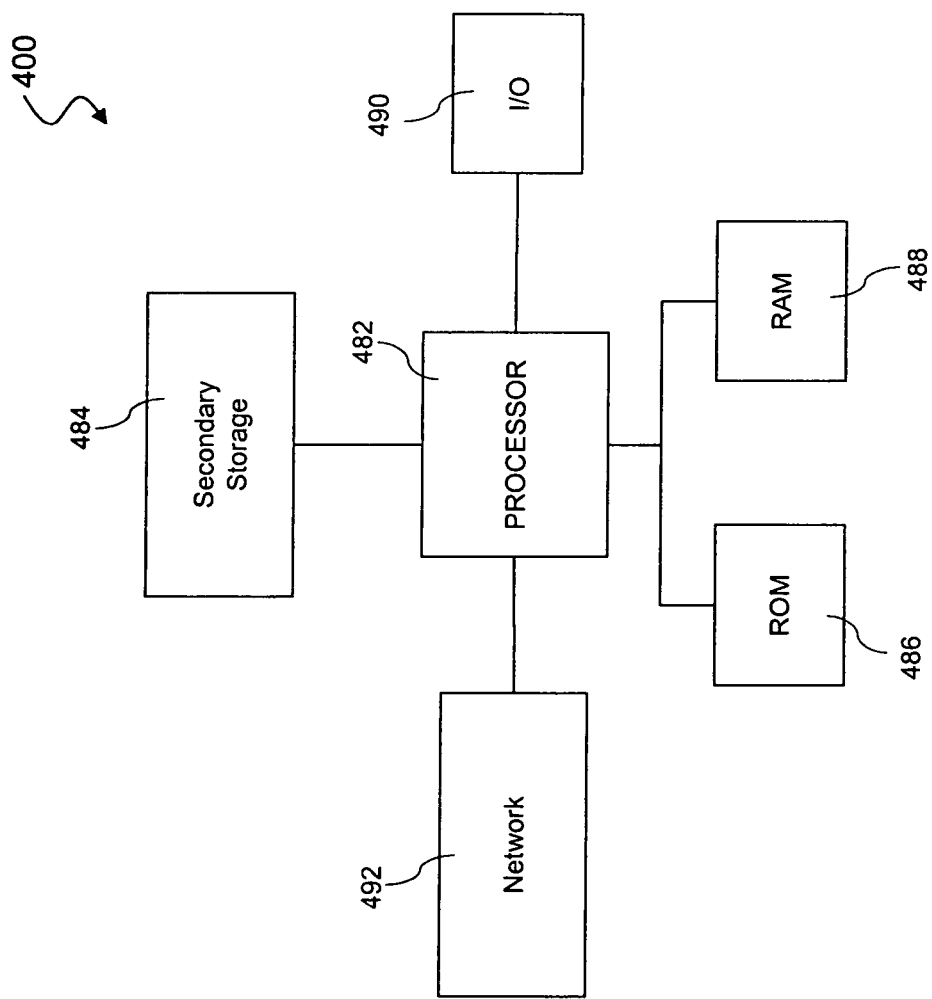
FIG. 4 illustrates an exemplary general-purpose computer system suitable for implementing the several embodiments of the present disclosure.

The system 100 and method 300 described above may be implemented on any general-purpose computer with sufficient processing power, memory resources, and network throughput capability to handle the necessary workload placed upon it. FIG. 4 illustrates a typical, general-purpose computer system 400 suitable for implementing one or more embodiments disclosed herein. The computer system 400 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs, which are loaded into RAM 488 when such programs are selected for execution. The ROM 486 is used to store instructions and perhaps data that are read during program execution. ROM 486 is a non-volatile memory device, which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 482 executes instructions, codes, computer programs, scripts that it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for personalizing a user experience on a mobile computing device, comprising:
    a mobile computing device comprising a memory and a user environment component, the user environment component configured to:
        generate navigational data associated with interactions with the mobile computing device by the user, wherein the navigational data includes data associated with user interactions with a catalog comprising menus of content; and
        receive content which the user is anticipated to select through the catalog for storage in a cache on the mobile computing device; and
    a server in communication with the mobile computing device comprising a memory and a user environment manager component configured to:
        receive the navigational data from the user environment component;
        predictively select the content which the user is anticipated to select through the catalog using the navigational data, data associated with resources of the cache, and information associated with the user stored on other systems different than the mobile computing device and the server, wherein the predictively selected content is selected from content underlying one or more of the menus of content in the catalog; and
        push the predictively selected content to the cache on the mobile device automatically prior to the mobile device requesting the predictively selected content.

2. The system of claim 1, wherein the user environment component further comprises:
    a hierarchical traversal engine operable for gathering the navigational data based upon the user's interactions;
    a caching component operable for storing the content received from the server in the cache on the mobile device; and
    a content template component operable for placing one or more portions of the content from the server into one or more pre-fabricated templates employed for creating a graphical user interface (GUI).

3. The system of claim 1, wherein the user environment manager component further comprises:
    a rules engine operable for determining user preferences based upon the navigational data from the user environment component and for providing content customized to the user preferences; and
    a caching engine operable for storing and collecting the content customized to the user preferences.

4. The system of claim 3, wherein the rules engine further comprises a profile data provided by a customer database, the profile data associated with the user and utilized with the navigation data to determine content to be predictively provided to the user environment component.

5. The system of claim 3, wherein the caching engine further comprises:
    a static caching component operable for storing aspects of a first event associated with the user's interactions on the mobile computing device,
    a proactive caching component operable for predicting a second event based upon the aspects of the first event associated with the user's interactions, and
    a synchronize caching component operable to push new content when currently cached content on the mobile device has become out of date.

6. The system of claim 5, wherein the proactive caching component caches a catalog having menu selections and associated content based upon the navigational data, the menu selections and content of the catalog adjustable to manage usage of the memory storage resources of the cache on the mobile computing device.

7. The system of claim 5, wherein the proactive caching component caches content based upon frequently traversed GUI menu trees associated with the user experience selected by the user.

8. The system of claim 1, wherein the user environment manager component transmits a catalog with customized menu selections to the user environment component based upon the navigational data, the customized menu selections altered according to aspects of the navigational data.

9. The system of claim 1, wherein the content stored in the cache comprises a portion of the information stored on a data store associated with the server.

10. The system of claim 1, wherein the content stored in the cache comprises a portion of a catalog stored on a data store associated with the server.

11. The system of claim 1, wherein the mobile computing device is one of a mobile telephone handset, or a portable video player.

12. The system of claim 1, wherein the user environment component assembles the content into a graphical user interface.

13. The system of claim 1, wherein the data associated with resources of the cache includes an amount of storage resources of the cache.

14. A system for personalizing a user experience on a mobile computing device, comprising:
    a server in communication with the mobile computing device comprising a memory and a user environment manager component configured to:
        receive navigational data from the mobile computing device associated with interactions with the mobile computing device by the user, wherein the navigational data includes data associated with user interactions with a catalog comprising menus of content;
        predictively select content which the user is anticipated to select through the catalog using the navigational data and other information associated with the user stored on other systems different than the mobile computing device and the server, wherein the predictively selected content is selected from content underlying one or more of the menus of content in the catalog; and
        push the predictively selected content to a cache on the mobile device automatically prior to receiving a request from the mobile device for the predictively selected content.

* * * * *

UNITED STATES PATENT AND TRADEMARK OFFICE
CERTIFICATE OF CORRECTION

PATENT NO. : 7,769,805 B1  
APPLICATION NO. : 11/395190  
DATED : August 3, 2010  
INVENTOR(S) : James D. Barnes, Sanjay Kumar Sharma and Robin D. Katzer It is certified that error appears in the above-identified patent and that said Letters Patent is hereby corrected as shown below:

On the title page, at Item [73], please delete Assignee "Spring Communications Company L.P." and add Assignee -- Sprint Communications Company L.P. --.

Signed and Sealed this  
Twenty-fifth Day of June, 2013

Teresa Stanek Rea  
*Acting Director of the United States Patent and Trademark Office*